US011676405B2

(12) United States Patent
Harrison

(10) Patent No.: US 11,676,405 B2
(45) Date of Patent: *Jun. 13, 2023

(54) IDENTIFICATION OF OBJECTS FOR THREE-DIMENSIONAL DEPTH IMAGING

(71) Applicant: Intel Corporation, Santa Clara, CA (US)

(72) Inventor: Edward R. Harrison, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/181,900

(22) Filed: Feb. 22, 2021

(65) Prior Publication Data

US 2021/0182534 A1 Jun. 17, 2021

Related U.S. Application Data

(63) Continuation of application No. 15/777,129, filed as application No. PCT/US2015/000456 on Dec. 26, 2015, now Pat. No. 10,929,642.

(51) Int. Cl.
*G06V 20/64* (2022.01)
*G06V 20/52* (2022.01)
(Continued)

(52) U.S. Cl.
CPC .............. *G06V 20/64* (2022.01); *G06V 20/52* (2022.01); *G06V 20/80* (2022.01);
(Continued)

(58) Field of Classification Search
CPC .......... G06K 9/00201; G06K 9/00496; G06K 9/00771; G06K 9/00577; H04W 4/02; H04W 4/029
(Continued)

(56) References Cited

U.S. PATENT DOCUMENTS

2010/0150122 A1 6/2010 Berger et al.
2011/0001844 A1* 1/2011 Suzuki ................ G06K 9/00
348/226.1
(Continued)

FOREIGN PATENT DOCUMENTS

WO 2014025696 2/2014

OTHER PUBLICATIONS

International Bureau, "International Preliminary Report on Patentability," mailed in connection with International Patent Application No. PCT/US2015/000456, dated Jun. 26, 2018, 11 pages.
(Continued)

*Primary Examiner* — Lin Ye
*Assistant Examiner* — Chan T Nguyen
(74) *Attorney, Agent, or Firm* — Hanley, Flight & Zimmerman, LLC

(57) ABSTRACT

Embodiments are generally directed to identification of objects for three-dimensional depth imaging. An embodiment of an apparatus includes one or more processors to process image data and control operation of the apparatus; an image sensor to collect image data; and a receiver and transmitter for communication of data, wherein the apparatus is to receive a notification of a first device entering a physical space, transmit a request to the device for a light signal to identify the device, detect the light signal from the device, determine a location of the device, and store an identification for the first device and the determined location of the first device in a database.

20 Claims, 7 Drawing Sheets

(51) Int. Cl.
*G06V 20/80* (2022.01)
*H04W 4/029* (2018.01)
*H04W 4/02* (2018.01)

(52) U.S. Cl.
CPC .......... *G06F 2218/00* (2023.01); *H04W 4/02* (2013.01); *H04W 4/029* (2018.02)

(58) Field of Classification Search
USPC ...................................... 725/105; 348/211.99
See application file for complete search history.

(56) References Cited

U.S. PATENT DOCUMENTS

| | | |
|---|---|---|
| 2012/0194516 A1 | 8/2012 | Newcombe et al. |
| 2013/0057702 A1* | 3/2013 | Chavan .............. G08B 21/0476 348/169 |
| 2013/0138499 A1* | 5/2013 | Tu ...................... G06Q 30/0241 705/14.41 |
| 2013/0220085 A1* | 8/2013 | Hsieh ...................... B25B 13/04 81/186 |
| 2013/0247117 A1 | 9/2013 | Yamada et al. |
| 2014/0218517 A1* | 8/2014 | Kim ................. H04N 21/41407 348/143 |
| 2014/0334669 A1 | 11/2014 | Acharya |
| 2015/0153715 A1* | 6/2015 | Kauffmann ........... A63F 13/213 348/46 |
| 2016/0067547 A1* | 3/2016 | Anthony ............. G01P 15/0891 702/141 |
| 2017/0093882 A1 | 3/2017 | Khuu et al. |
| 2017/0142251 A1* | 5/2017 | Lupcho, III .......... H04W 4/029 |
| 2018/0336396 A1 | 11/2018 | Harrison |

OTHER PUBLICATIONS

International Searching Authority, "International Search Report," mailed in connection with International Patent Application No. PCT/US2015/000456, dated Sep. 21, 2016, 3 pages.

International Searching Authority, "Written Opinion," mailed in connection with International Patent Application No. PCT/US2015/000456, dated Sep. 21, 2016, 9 pages.

United States Patent and Trademark Office, "Notice of Allowance," mailed in connection with U.S. Appl. No. 15/777,129, dated Oct. 21, 2020, 9 pages.

United States Patent and Trademark Office, "Non-final Office Action," mailed in connection with U.S. Appl. No. 15/777,129, dated May 27, 2020, 20 pages.

United States Patent and Trademark Office, "Final Office Action," mailed in connection with U.S. Appl. No. 15/777,129, dated Jan. 7, 2020, 15 pages.

United States Patent and Trademark Office, "Non-final Office Action," mailed in connection with U.S. Appl. No. 15/777,129, dated Jun. 19, 2019, 13 pages.

* cited by examiner

IDENTIFICATION OF OBJECTS FOR THREE-DIMENSIONAL DEPTH IMAGING

RELATED APPLICATIONS

The patent arises from a continuation of U.S. patent application Ser. No. 15/777,129, which was filed on May 17, 2018, which is a National Stage Entry of PCT Patent Application Serial No. PCT/US2015/000456, which was filed on Dec. 26, 2015. U.S. patent application Ser. No. 15/777,129 and PCT Patent Application No. PCT/US2015/000456 are hereby incorporated herein by reference in their entireties. Priority to U.S. patent application Ser. No. 15/777,129 and PCT Patent Application No. PCT/US2015/000456 is hereby claimed.

TECHNICAL FIELD

Embodiments described herein generally relate to the field of electronic devices and, more particularly, to identification of objects for three-dimensional depth imaging.

BACKGROUND

A particular environment, including home, industrial setting, or other environment, may include may different items that can networked by the Internet of Things (IoT) or other network connections, which allows for the connection of an increasing variety of devices and systems.

Further, an environment may include visual sensors that may be used in conjunction with items within such an environment.

However, the identity of individual items often is not easily discerned by a visual sensor. For this reason, the interrelation between a visual sensor and networked items may be awkward, and may require time consuming identification processes to enable the visual sensor to correctly identify networked items.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
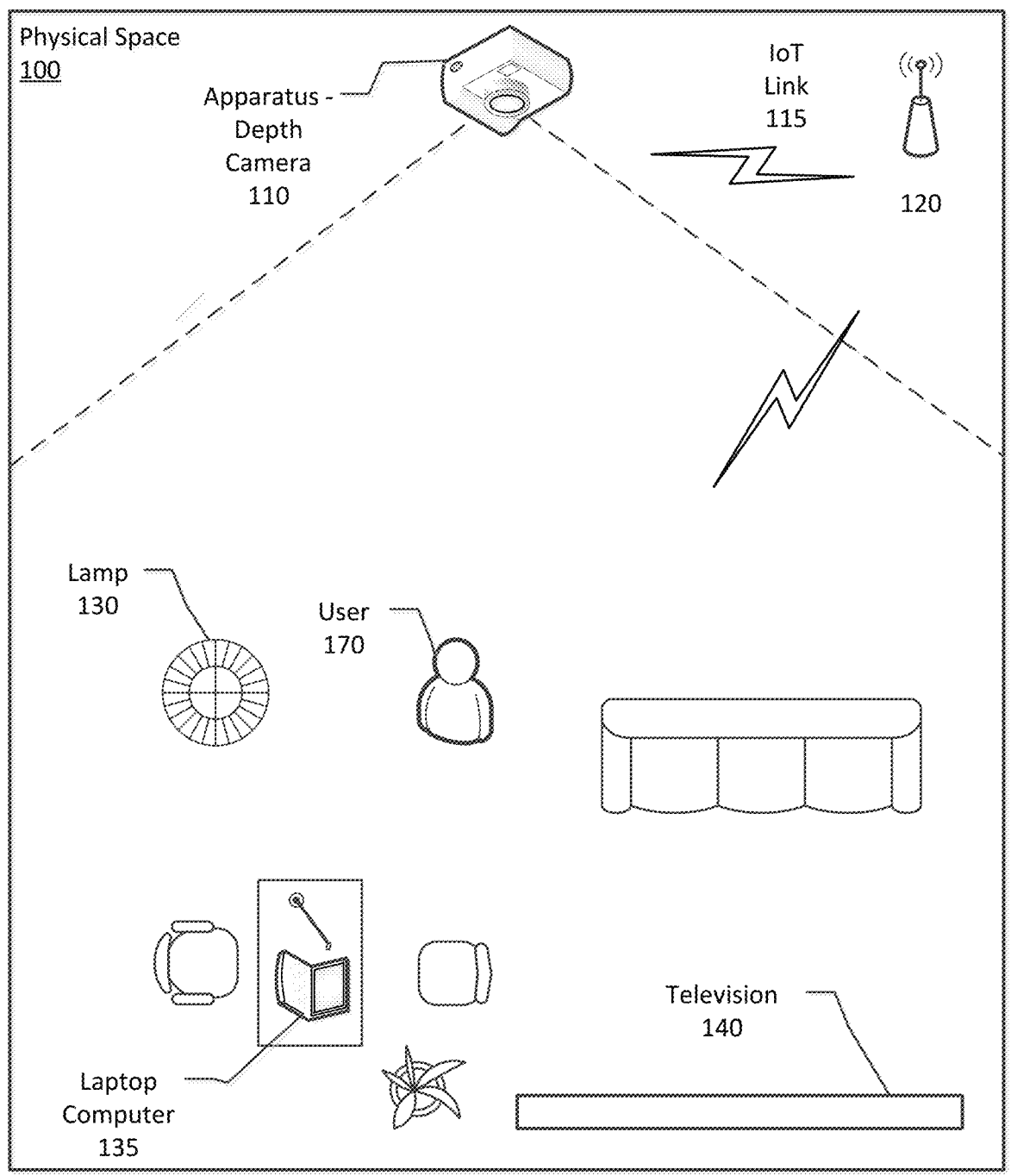
FIG. 1 is an illustration of physical space including network devices according to an embodiment.

Embodiments described herein are generally directed to identification of objects for three-dimensional depth imaging.

For the purposes of this description, the following apply:

"Depth camera" or "3D camera" refers to a visual sensor that in general determines a distance for each point of an image. A depth camera may also be referred to as a time-of-flight camera, or ranging camera. A depth camera may include, for example, an Intel RealSense™ camera. Other examples of depth cameras include cameras that are embedded in certain gaming consoles for the purpose of tracking the movements of game participants.

"Sensor" means a mechanism to detect conditions, events, or changes in an environment and to produce a resulting output, wherein the output may be referred to as sensor data, sensing data, or similar terms. The output of a sensor may include, but is not limited to, electrical and optical signals. Conditions, events, and changes in an environment may include, but are limited to, temperature, light (luminosity), sound, moisture, humidity, barometric pressure, vibration, electrical or magnetic fields, motion, and acceleration.

"Physical space" means any space or sub-space within or outside of a physical structure.

In some embodiments, an apparatus, system, or process provides for identification of objects for three-dimensional depth imaging.

In some embodiments, an apparatus including a depth camera is used in a certain physical space in conjunction with objects within the physical space, such as a room or other defined space. In many three-dimensional (3D) applications it is desirable to identify the location of objects in the space in order that the 3D application is able to act upon those objects. However, the process of identifying such objects is cumbersome and time consuming in a conventional system, particularly for objects that move often.

In some embodiments, an apparatus, system, or process provides for objects identifying themselves to a depth camera. In some embodiments, the identification of an object to a depth camera includes use of a light signal (generally referred to herein as blinking), which may include a visible or non-visible (such as infrared or ultraviolet) light signal, in the form of an identifiable pattern that is sensed by the depth camera. In some embodiments, the identification may include a network address or other information to identify an object.

In some embodiments, the type of pattern provided by an object may vary for different types of object or different implementations. In some embodiments, the pattern is provided by blinking (turning on and off) the light signal. In some embodiments, the pattern of blinking provides a particular identification using space coding with the pulses of light. In some embodiments, other types of patterns may be used, such as a static code pattern. In other embodiments, a different type of light signal is provided, such as projected signal that can be detected by the depth camera. In certain implementations, use of non-visible light may be beneficial so that the identification and binding process for an object can be accomplished without disturbing a room occupant.

In some embodiments, an apparatus, system, or process provides for automatic identification and binding of objects in an environment. The binding of physical device to physical location, if performed manually by a user, would result in a cumbersome and time-consuming setup process as devices are added to a room or other environment, or if such objects moved within the room. In some embodiments, an automatic process for device discovery and binding is performed, thereby freeing a user from the setup duties, wherein the binding process can be performed without the presence of a user, and providing increased speed and accuracy for device recognition.

In some embodiments, devices are connected in a network that is accessible by the depth camera, including, but not limited to the Internet of Things (IoT). In some embodiments, a device is identified to the IoT network (without regard to the technology by which the device is identified) within a particular physical space. In some embodiments, in response to the identification of the device to the network, an apparatus including a depth camera obtains or receives information regarding the device and sends a request to the device to identify itself. In some embodiments, the apparatus may utilize the IoT network to transmit the request to the device. However, embodiments are not limited to this particular implementation, and the request may otherwise be provided, such as by use of a direct wireless transmission to objects within the physical space.

In some embodiments, in response to a request from the apparatus, the device identifies itself using a light signal, such as a blink pattern. In some embodiments, the apparatus is to monitor for the light signal and to detect the pattern using the visual sensor capability of the depth camera. In some embodiments, the device's location with the physical space, such as an x-y-z coordinate location (or any other three-dimensional coordinate system) within the physical space is established using the ranging finding capability of the depth camera. At this point, the apparatus is able to bind the network identity of the device to the physical location of the device.

In some embodiments, a device within a physical environment may further provide a notice when the device has been moved to allow for renewing the binding of the device to a new location. In some embodiments, a device may utilize a sensor to detect the movement of the device. In one example, a sensor may include a technology such as an accelerometer to determine a particular acceleration. However, embodiments are not limited to such a sensor, and may include any sensor that may be used to detect movement or possible movement. In another example, a simple sensor such as a pressure sensor on a base of a device or a vibration sensor within a device may detect a possible movement of a device. In some embodiments, a depth camera may operate to automatically perform a re-scan of the particular device that has moved or has potentially moved to bind such device to its new location.

In some embodiments, a depth camera may periodically redetect all items in a location, which allows determining whether any new objects are present that weren't identified, or if any objects have been removed from the area that were not sensed.

In some embodiments, a device in a physical space is operable to alternatively initiate a detection process, rather than acting in response to a request from a camera to blink identity information. For example, when a new device is brought into an environment, the new device may begin blinking the identification of the device to trigger a camera to detect the device, determine coordinates for the location of the device, and bind the device identity and location.

In some embodiments, a room occupant may alternatively manually initiate a scanning process for a device when the user moves the device or becomes aware that the device has been moved. The alternative initiation of the scanning process may be required if a particular device is not capable to detecting a movement of the object.

Figure 4:
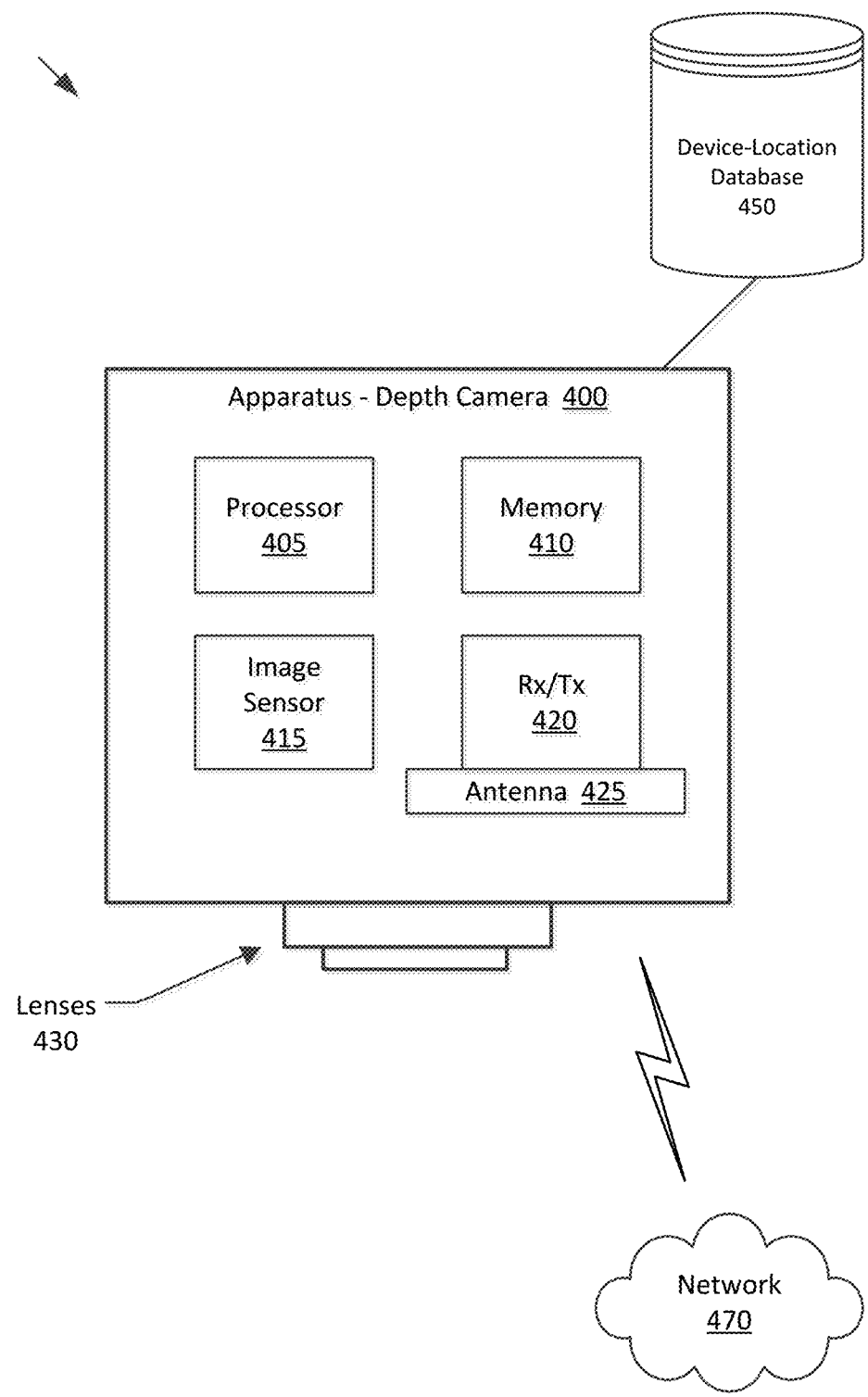
FIG. 4 is an illustration of an apparatus including a depth camera according to an embodiment.

FIG. 1 is an illustration of physical space including network devices according to an embodiment. In some embodiments, a physical space 100 may be a home setting, an industrial setting, or any other indoor or outdoor space. In some embodiments, at least one apparatus including a depth camera 110 is positioned to sense images of contents of the physical space 100. The apparatus, which may include elements of apparatus 400 illustrated in FIG. 4, is connected to a network, which may include an IoT link via a wireless router, hot spot, or similar wireless element 120. While for purposes of illustration the physical space is shown as including one depth camera 110, the space may include multiple cameras, wherein the multiple cameras may operate cooperatively, thereby improving resolution of imaging and addressing imaging issues such as viewing obstruction, location confusion caused by mirrors, or other limitations of a single camera.

In some embodiments, the physical space may include one or more devices that are also networked, including IoT devices. In a particular example, the physical space may include networked devices such as a lamp 130, a laptop computer 135, and a television 140. Other possible devices may include a control unit for another device, such as a thermostat for a heating and cooling system. In some embodiments, upon each of the devices being connected to the network and introduced into the physical space 100, the apparatus 110 will store an identification (such as a network address) for the device, request a signal from the device (a blinking signal or other light signal that is detectable by the depth camera), identify the device and locate the coordinates of the device, and bind the device identification and location in a database, wherein the database may be local to the apparatus or may be remote from the apparatus, such as a database that is accesses via the network. In some embodiments, multiple apparatuses may share access to the same database. In some embodiments, the apparatus 110 may re-initialize the binding of a device upon the device moving to a new location.

Further, a user 170 may be present in the physical space 100. In some embodiments, a system (such as system 700 illustrated in FIG. 7) utilizes the operation of the apparatus with depth camera 110 to bind the identification and location of networked devices, and utilizes the depth camera and database to control devices in the physical space. Determining a location includes determining a location in three-dimensional space. In an example, the user 170 could provide a gesture directed to the lamp 130, which is recognized by the apparatus utilizing the depth camera 110 to allow linking of the intended command to the intended target, such as turning the lamp 130 on or off or adjusting a brightness of such lamp.

In some embodiments, a device such as the lamp 130 may provide an identifiable pattern by blinking, wherein the blinking light may preferably be in the infrared (or ultraviolet) so the signal is not visible to person present in the area. In some embodiments, devices other than lamps or other light producing devices may include one or more visible or nonvisible LEDs in order to provide a signal to the depth camera. In some embodiments, a display device including a display screen, such as television 140, can provide an identifiable pattern on the screen such as a QR-Code (Quick Response Code) or other similar code pattern, which can generally be identified by a camera even at an angle.

In an example, in a room containing several IoT home control objects (lamps, appliances, entertainment devices, and other common devices) a room-mounted depth camera can be used to allow the occupant of the room to point to objects and request an action upon that object (such as to turn the object on or off). In order for this operation to work properly, the application that is utilized requires the establishment of a binding between the objects' locations in space and the physical identity of the device (such as an IPv6 (Internet protocol version 6) address, or other such identifier). However, embodiments are not limited to IoT devices, and can also apply to devices such as appliances, toys, and other items. In some embodiments, a complete operation may be implemented by a user pointing at the device (or otherwise identifying the device by visual or verbal means) and using a gesture or verbal command to act on the object.

In some embodiments, operations may occur in an industrial environment in which, for example, a detection process may include binding of the identities of multiple industrial robots with the location coordinates for each such robot. In a busy industrial setting, such process may allow flexible and accurate control of the robotic operations using gestures directed to each such robot.

Figure 2:
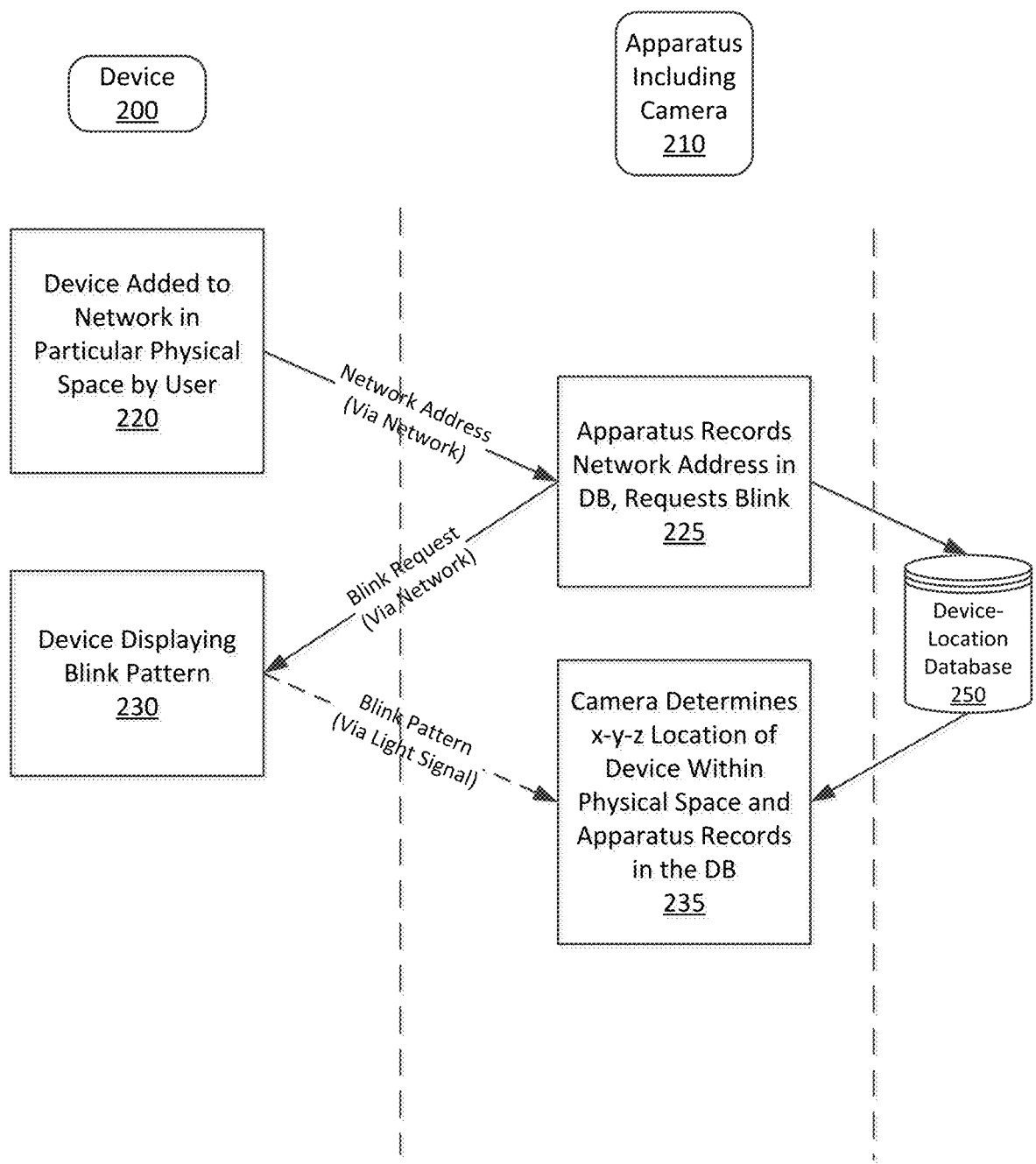
FIG. 2 is an illustration of a process for binding of device identity and location according to an embodiment.

FIG. 2 is an illustration of a process for binding of device identity and location according to an embodiment. In some embodiments, a device 200 may be added to a network by a user for operation in particular environment (process 220), wherein a network address (or other identification) is provided to an apparatus including a camera 210 via the network. In some embodiments, the apparatus 200 records the network address in a database 250 (process 225), such as the illustrated device-location database 250, and provides a blink request to the device 200 via the network (process 230).

In some embodiments, the device 200 is to respond to the request by displaying a blink pattern or other light signal (process 230) to identify the device 200 via the light signal. In some embodiments, the apparatus 210 then utilizes the camera to determine location coordinates (such as x-y-z coordinates in three-dimensional space) of the device 200 within the physical space and the apparatus 210 records such information (process 235) in the database 250, thereby binding the device identity and location for purpose of use in an application for the device 200.

Figure 3:
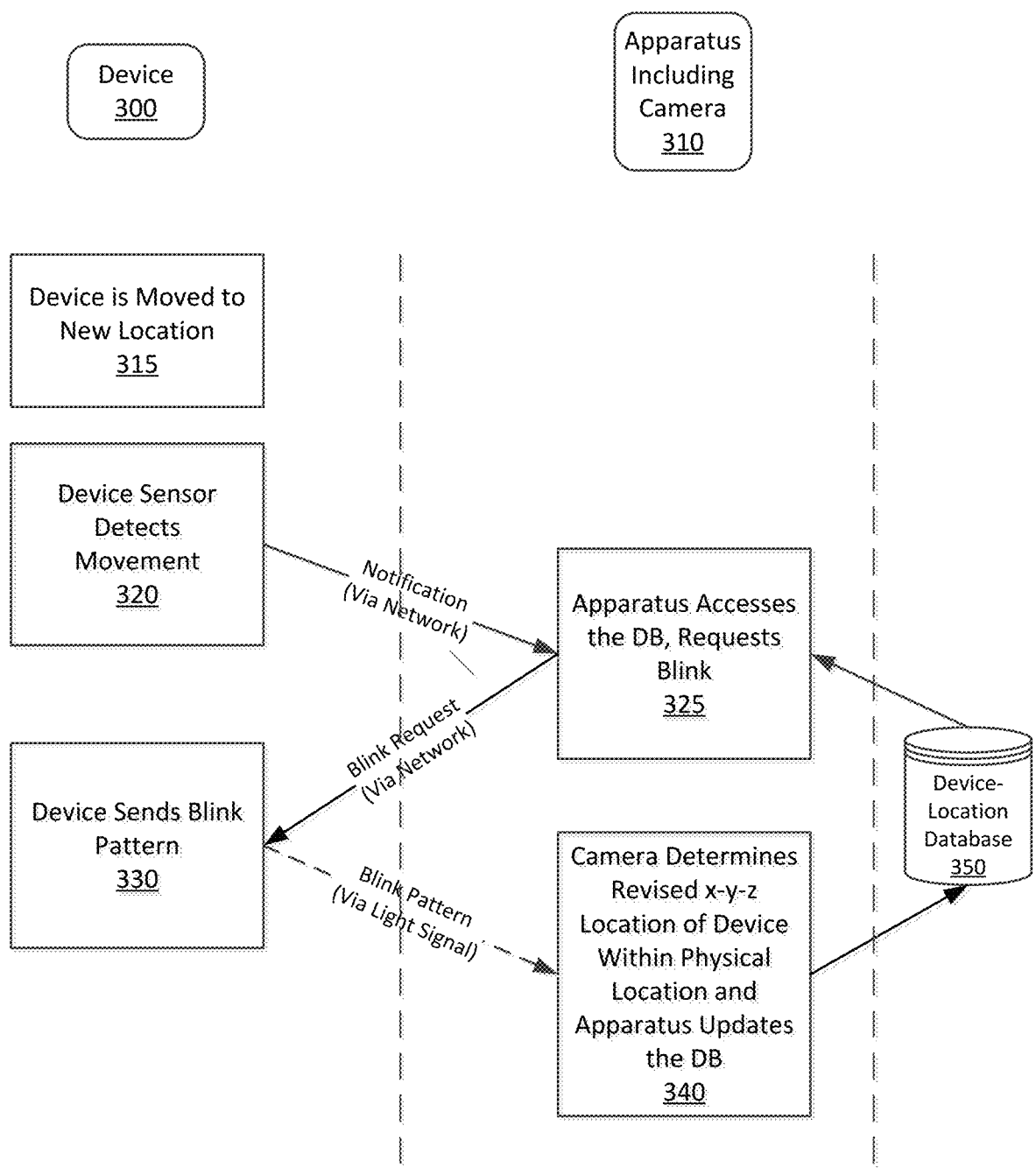
FIG. 3 is an illustration of a process for binding of device identity and location for a device that is moved according to an embodiment.

FIG. 3 is an illustration of a process for binding of device identity and location for a device that is moved according to an embodiment. In some embodiments, a networked device 300 is moved to a new location in a physical space (process 315). In some embodiments, a device sensor may detect movement of the device (process 320), and provide notification regarding the movement to an apparatus including a camera 310 via the network. In some embodiments, the apparatus 310 is to access the database 350 to obtain information regarding the prior location of the device 300 and provide a blink request to the device 300 via the network (process 325).

In some embodiments, the device 300 is to respond to the request by displaying a blink pattern or other light signal to identify the device 300 via the light signal (process 330). In some embodiments, the apparatus 310 is to then to utilize the camera to determine revised location coordinates of the device 300 (wherein determining a location includes determining a location in three-dimensional space) within the physical space and the apparatus 310 is to record such information in the database (process 340), thereby binding the device identity and new location.

FIG. 4 is an illustration of an apparatus including a depth camera according to an embodiment. FIG. 4 is a high level drawing provided for illustration, and an apparatus 400 is not limited to the elements illustrated in FIG. 4.

In some embodiments, an apparatus 400 includes an interface with a device-location database 450 for purposes of storing and accessing device identity and location information, and an interface with a network 470 (such as IoT) for purposes including transmitting and receiving communications regarding devices within a physical space. In some embodiments, the device-location database may be local to the camera, including, but not limited to, an implementation in which the camera and database are located in a same apparatus. In some embodiments, device-location database is remote from the camera 400, such as a database that is located in a different location on a network). In some embodiments, multiple cameras may utilize a same database such as a single joint database with multiple cameras each reporting locations to the joint database.

In some embodiments, the apparatus 400 incudes one or more processors 405 to process image data and control operation of the depth camera; a memory 410 (which may include removable or external memory) to store data including image data for devices within the physical space; an image sensor 415 to collect image data; a receiver and transmitter 420 for communication of data via the network 470; one or more antennas 420 for data reception and transmission; and one or more lenses and related devices for focusing of a camera.

Figure 5:
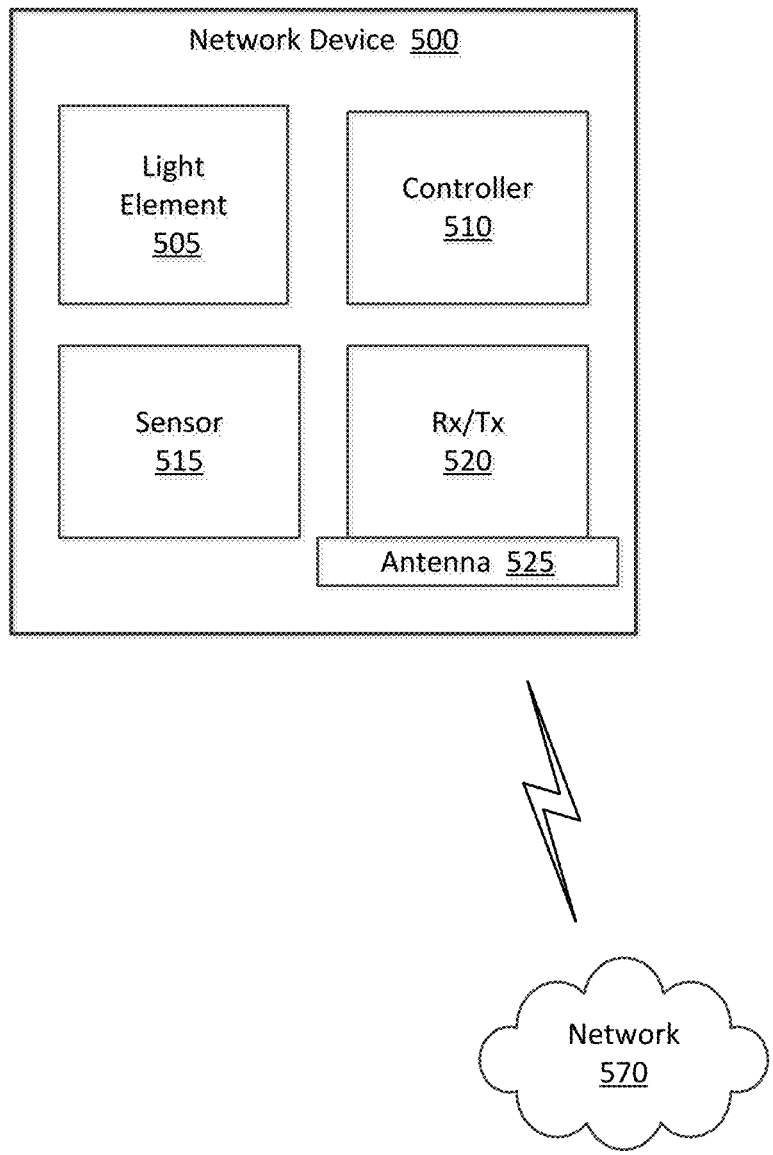
FIG. 5 is an illustration of a network device according to an embodiment.

FIG. 5 is an illustration of a network device according to an embodiment. FIG. 5 is a high level drawing provided for illustration, and a network object 500 is not limited to the elements illustrated in FIG. 5.

In some embodiments, a network device 500 includes an interface with network 570 (such as IoT) for purposes including, but not limited to, transmitting and receiving communications with one of more cameras within the physical space.

In some embodiments, the network object 500 incudes a light element 505 to provide a light signal (visible or nonvisible) to communicate identity information (such as a network address) for the network device 500, and controller 510 to control operation of network device 500, including the presentation of the light signal by the light element 505. In some embodiments, the network device 500 may further include a sensor 515, such as a motion sensor, to sense when the network device 500 is being moved; and a receiver and transmitter 520 for communication of data via the network 570; and one or more antennas 525 for data reception and transmission.

Figure 6:
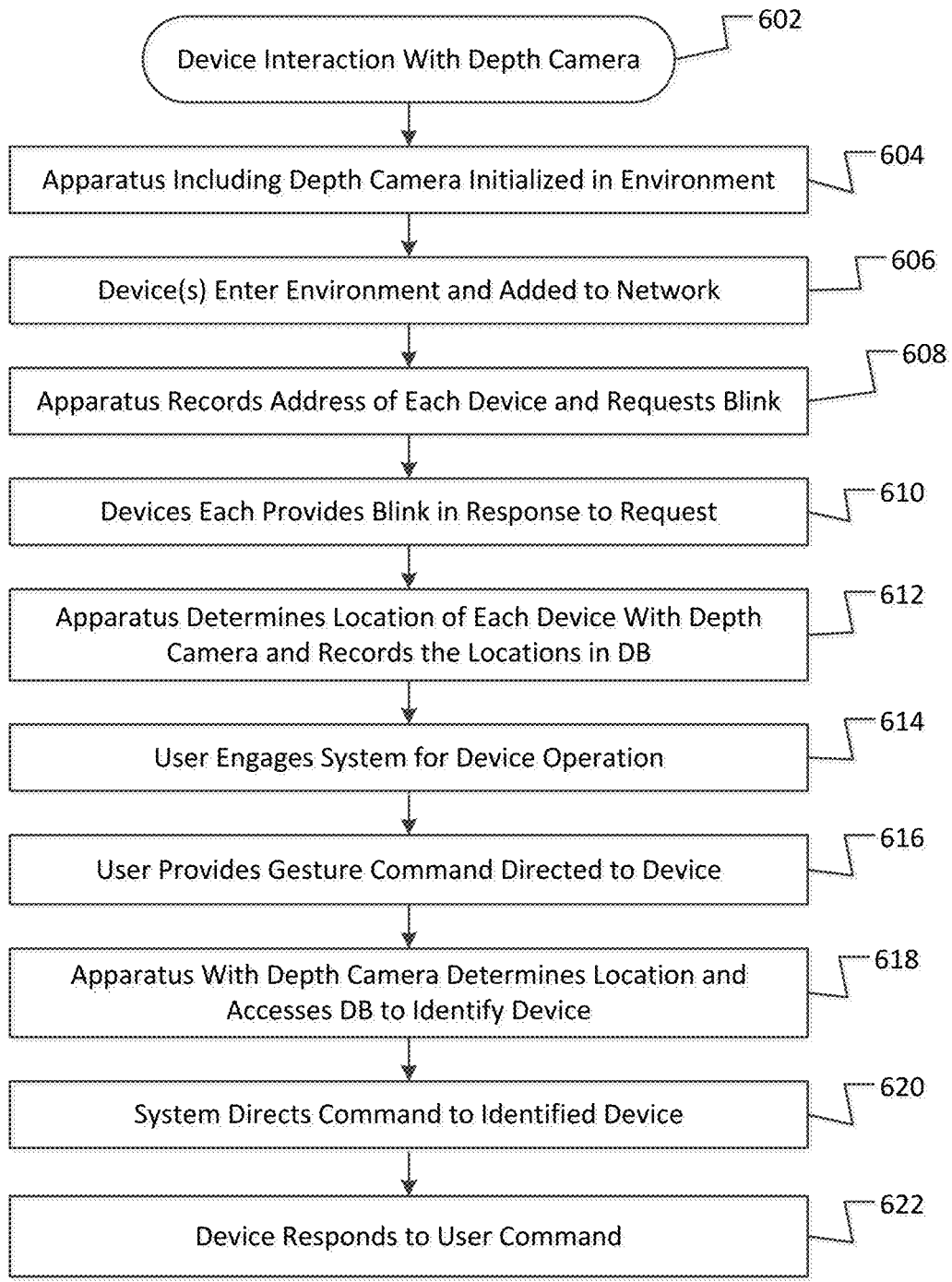
FIG. 6 is a flowchart to illustrate a process for device interaction with a depth camera according to an embodiment.

FIG. 6 is a flowchart to illustrate a process for device interaction with a depth camera according to an embodiment. In some embodiments, a process for device interaction with a depth camera 602 includes an apparatus including a depth camera being initialized in an environment 604, including connection of the apparatus to a device-location database and to a network, such as IoT. In some embodiments, upon one or more devices entering the environment and being added to the network 606, the apparatus is to record the address of each such device in a database (which may be a local or remote database) and request each device (such as a request being provided via the network) to provide a blink signal (or other light signal) 608. In some embodiments, each device is to provide the blink signal in response to the request 610. In some embodiments, the apparatus determines the coordinate location of each such device with the depth camera and records the locations in the database 612.

In some embodiments, upon a user engaging a system for device operation 614, the user can provide a gesture command directed to a particular device 616. In some embodiments, the apparatus is to determine the location of the device and access the database to identify the device at that location 618. In some embodiments, the system is to direct the command to the identified device 620, such as via the network, and the device then may respond to the user command 622.

Figure 7:
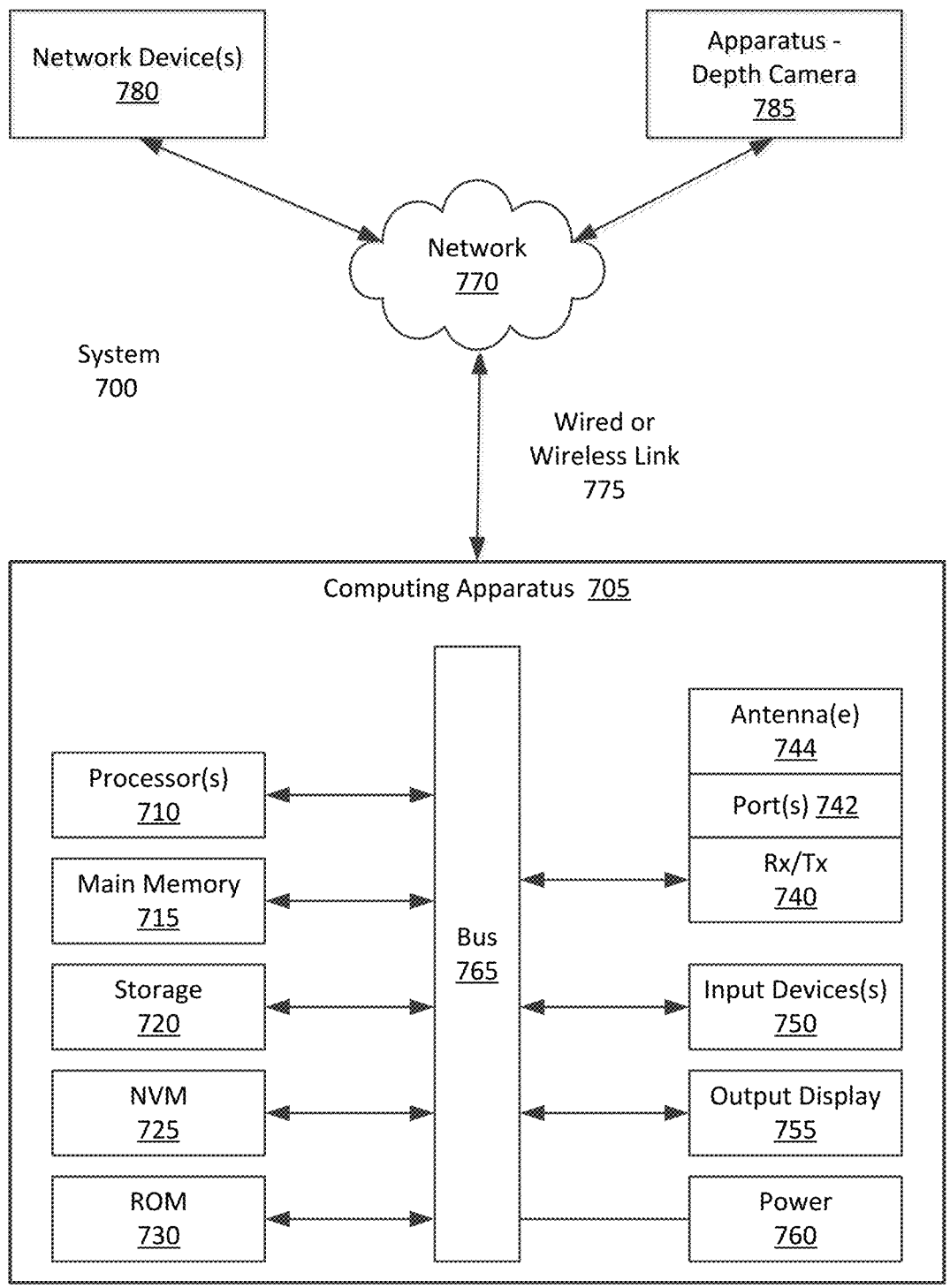
FIG. 7 is an illustration of an embodiment of a system according to an embodiment.

FIG. 7 is an illustration of an embodiment of a system according to an embodiment. In this illustration, certain standard and well-known components that are not germane to the present description are not shown. Elements shown as separate elements may be combined, including, for example, an SoC (System on Chip) or System in Package combining multiple elements on a single chip or package.

In some embodiments, a system 700 includes a computing apparatus 705, one or more network devices 780 (such as illustrated in FIGS. 1 and 5), and an apparatus including a depth camera 785 (such as illustrated in FIGS. 1 and 4). In some embodiments, the elements of the system operate in a network 770 via wired or wireless links 775, where the network 770 may include, but is not limited to, IoT.

In some embodiments, the computing apparatus 705 includes processing means such as one or more processors 710 coupled to one or more buses or interconnects, shown in general as bus 765. The processors 710 may comprise one or more physical processors and one or more logical processors. In some embodiments, the processors may include one or more general-purpose processors or special-processor processors. The bus 765 is a communication means for transmission of data. The bus 765 is illustrated as a single bus for simplicity, but may represent multiple different interconnects or buses and the component connections to such interconnects or buses may vary. The bus 765 shown in FIG. 7 is an abstraction that represents any one or more separate physical buses, point-to-point connections, or both connected by appropriate bridges, adapters, or controllers.

In some embodiments, the processors 710 are to process data including control data for network devices 780, wherein the control data may be based at least in part on recognition of the network devices 780 by the apparatus 785.

In some embodiments, the computing apparatus 705 further comprises a random access memory (RAM) or other dynamic storage device or element as a main memory 715 for storing information and instructions to be executed by the processors 710. Main memory 715 may include, but is not limited to, dynamic random access memory (DRAM).

In some embodiments, the computing apparatus 705 further comprises one or more storage devices 720, such as a hard drive or solid state drive (SSD). In some embodiments, a device-location database may be stored utilizing the one or more storage devices. However, embodiments are not limited to this implementation, and such database may be stored in another location.

The computing apparatus 705 also may comprise a non-volatile memory (NVM) 725; and a read only memory (ROM) 730 or other static storage device for storing static information and instructions for the processors 710.

In some embodiments, the computing apparatus 705 includes one or more transmitters or receivers 740 coupled to the bus 765 to provide wired or wireless communications. In some embodiments, the computing apparatus 705 may include one or more antennae 744, such as dipole or monopole antennae, for the transmission and reception of data via wireless communication using a wireless transmitter, receiver, or both, and one or more ports 742 for the transmission and reception of data via wired communications. Wireless communication includes, but is not limited to, Wi-Fi, Bluetooth™, near field communication, and other wireless communication standards. Wired or wireless communications may include communications between the computing apparatus 705, the network devices 780, and the apparatus 785 via the network 770.

In some embodiments, computing apparatus 705 includes one or more input devices 750 for the input of data, including hard and soft buttons, a joy stick, a mouse or other pointing device, a keyboard, voice command system, or gesture recognition system.

In some embodiments, the computing apparatus 705 includes an output display 755, where the display 755 may include a liquid crystal display (LCD) or any other display technology, for displaying information or content to a user. In some environments, the display 755 may include a touch-screen that is also utilized as at least a part of an input device 750. Output display 755 may further include audio output, including one or more speakers, audio output jacks, or other audio, and other output to the user.

The computing apparatus 705 may also comprise a power source 760, which may include a transformer or power adapter, a battery, a solar cell, a fuel cell, a charged capacitor, near field inductive coupling, or other system or device for providing or generating power in the computing apparatus 705. The power provided by the power source 760 may be distributed as required to elements of the computing apparatus 705.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, an apparatus includes one or more processors to process image data and control operation of the apparatus; an image sensor to collect image data; and a receiver and transmitter for communication of data. In some embodiments, the apparatus is to receive a notification of a first device entering a physical space, transmit a request to the device for a light signal to identify the first device, detect the light signal from the first device, determine a location of the first device, and store an identification for the first device and the determined location of the first device in a database.

In some embodiments, determining a location includes determining a location in three-dimensional space.

In some embodiments, the apparatus further includes an interface with a network, the apparatus to receive the notification of the first device entering the physical space via the network.

In some embodiments, the apparatus is to transmit the request for a light signal to the device via the network.

In some embodiments, the network is the Internet of Things (IoT).

In some embodiments, the light signal is a blinking pattern.

In some embodiments, the light signal is a QR-Code (Quick Response Code).

In some embodiments, the light signal is transmitted using non-visible light.

In some embodiments, the apparatus includes a depth camera.

In some embodiments, the notification includes the identification of the first device.

In some embodiments, the light signal includes the identification of the first device, the apparatus to compare the identification received in the notification with the identification received in the light signal.

In some embodiments, the database is a remote database, the apparatus to access the remote database via the network.

In some embodiments, the apparatus is further to receive a notification that the first device has moved, the apparatus to: transmit a request to the first device for a light signal to identify the first device; detect a light signal from the first device; determine a new location of the first device; and update the database with the identity and new location of the first device.

In some embodiments, a non-transitory computer-readable storage medium having stored thereon data representing sequences of instructions that, when executed by a processor, cause the processor to perform operations including receiving at an apparatus a notification of a first device entering a physical space, the apparatus including a camera; transmitting by the apparatus a request to the device for a light signal to identify the first device, detecting with the camera the light signal from the first device; determining a location of the first device utilizing the camera; and storing an identification for the first device and the determined location of the first device in a database.

In some embodiments, receiving the notification of the first device entering the physical space includes receiving the notification of the first device entering the physical space via a network.

In some embodiments, transmitting the request for a light signal to the device includes transmitting the request via the network.

In some embodiments, the network is the Internet of Things (IoT).

In some embodiments, the camera includes a depth camera.

In some embodiments, receiving the notification includes receiving the identification of the first device.

In some embodiments, receiving the light signal includes receiving the identification of the first device, and further comprising instructions that, when executed by the processor, cause the processor to perform operations comprising comparing the identification received in the notification with the identification received in the light signal.

In some embodiments, the instruction further include instructions for receiving a notification at the apparatus that the first device has moved; transmitting by the apparatus a request to the first device for a light signal to identify the first device; detecting with the camera a light signal from the first device; determining a new location of the first device utilizing the camera; and updating the database with the identity and new location of the first device.

In some embodiments, a system includes an apparatus including one or more processors to process image data and control operation of the apparatus, a depth camera, and a receiver and transmitter for communication of data; a computing apparatus to control one or more devices; and a device-location database. In some embodiments, the apparatus is to determine locations of a plurality of devices in a physical space utilizing the depth camera and to store identification and location information for the devices in the device-location database: and the computing apparatus is to control the one or more devices in response to user instruction based at least in part on the identification and location information for the one or more devices in the device-location database.

In some embodiments, determining locations of the plurality of devices by the apparatus includes the apparatus to receive a notification of a first device entering a physical space, transmit a request to the device for a light signal to identify the first device; detect the light signal from the first device; determine a location of the first device utilizing the depth camera; and store an identification for the first device and the determined location of the first device in the database.

In some embodiments, determining locations of the plurality of devices by the apparatus includes the apparatus further to receive a notification of the first device moving to a new location; transmit a request to the first device for a light signal to identify the first device; detect a light signal from the first device; determine a new location of the first device utilizing the depth camera; and update the database with the identity and new location of the first device.

In some embodiments, the controlling of the one or more devices in response to user instruction includes the apparatus to detect a gesture by a user directed to a first device; the apparatus to determine the location of the first device and access the database to obtain the identity of the first device; and the computing apparatus to direct a command to the first device based at least in part on the gesture by the user and the identity information for the first device in the device-location database.

In some embodiments, an apparatus includes means for receiving at an apparatus a notification of a first device entering a physical space, the apparatus including a camera; means for transmitting by the apparatus a request to the device for a light signal to identify the first device; means for detecting with the camera the light signal from the first device; means for determining a location of the first device utilizing the camera; and means for storing an identification for the first device and the determined location of the first device in a database.

In some embodiments, the means for receiving the notification of the first device entering the physical space includes means for receiving the notification of the first device entering the physical space via a network.

In some embodiments, the means for transmitting the request for a light signal to the device includes means for transmitting the request via the network.

In some embodiments, the network is the Internet of Things (IoT).

In some embodiments, the camera includes a depth camera.

In some embodiments, the means for receiving the notification includes means for receiving the identification of the first device.

In some embodiments, the means for receiving the light signal includes means for receiving the identification of the first device, and the apparatus further includes means for comparing the identification received in the notification with the identification received in the light signal.

In some embodiments, the apparatus further includes means for receiving a notification at the apparatus that the first device has moved; means for transmitting by the apparatus a request to the first device for a light signal to identify the first device; means for detecting with the camera a light signal from the first device; means for determining a new location of the first device utilizing the camera; and means for updating the database with the identity and new location of the first device.

What is claimed is:

1. A network device comprising:
a light producing device; and
at least one processor to:
provide, via a network, first identification information of the network device to a camera device;
access a request from the camera device, the request to instruct the network device to use the light producing device to identify the network device, the request to be received from the camera device after the first identification information is provided to the camera device; and
cause, in response to the request, the light producing device to output a light signal, the light signal to convey second identification information of the network device to the camera device.

2. The network device of claim 1, wherein the at least one processor is to provide the first identification information in response to the network device being added to the network.

3. The network device of claim 1, wherein the first identification information is a network address of the network device.

4. The network device of claim 1, wherein the light signal is to convey the second identification information via a blinking pattern.

5. The network device of claim 1, wherein the light producing device includes a display device, and the light signal corresponds to a Quick Response Code that is to convey the second identification information.

6. The network device of claim 1, wherein the light producing device includes a light emitting diode, and the light signal is a non-visible light signal that is to convey the second identification information.

7. The network device of claim 1, further including a motion sensor, wherein the request is a first request, the light signal is a first light signal, and the at least one processor is to:
provide a notification to the camera device in response to movement detected by the motion sensor;
access a second request from the camera device, the second request to instruct the network device to use the light producing device to identify the network device, the second request to be received from the camera device after the notification is provided; and
cause, in response to the second request, the light producing device to output a second light signal to identify the network device.

8. At least one computer-readable storage device comprising instructions that, when executed, cause at least one processor of a network device to at least:
provide, via a network, first identification information of the network device to a camera device;
access a request from the camera device, the request to instruct the network device to use a light producing device to identify the network device, the request to be received from the camera device after the first identification information is provided to the camera device; and
cause, in response to the request, the light producing device to output a light signal, the light signal to convey second identification information of the network device to the camera device.

9. The at least one computer-readable storage device of claim 8, including further instructions that, when executed, cause the at least one processor to provide the first identification information in response to the network device being added to the network.

10. The at least one computer-readable storage device of claim 8, wherein the first identification information is a network address of the network device.

11. The at least one computer-readable storage device of claim 8, wherein the light signal is to convey the second identification information via a blinking pattern.

12. The at least one computer-readable storage device of claim 8, wherein the light producing device includes a display device, and the light signal corresponds to a Quick Response Code that is to convey the second identification information.

13. The at least one computer-readable storage device of claim 8, wherein the light producing device includes a light emitting diode, and the light signal is a non-visible light signal that is to convey the second identification information.

14. The at least one computer-readable storage device of claim 8, wherein the request is a first request, the light signal is a first light signal, and including further instructions that, when executed, cause the at least one the processor to:
provide a notification to the camera device in response to movement detected by a motion sensor;
access a second request from the camera device, the second request to instruct the first network device to use the light producing device to identify the network device, the second request to be received from the camera device after the notification is provided; and
cause, in response to the second request, the light producing device to output a second light signal to identify the network device.

15. A system comprising:
a camera apparatus to control network devices in a physical space in response to user commands; and
a first one of the network devices to:
provide, via a network, first identification information of the first one of the network devices to the camera apparatus;
access a request from the camera apparatus, the request to instruct the first one of the network devices to use a light signal of a light producing device to identify the first one of the network devices, the request to be received from the camera apparatus after the first identification information is provided to the apparatus; and
cause, in response to the request, the light producing device to output a light signal, the light signal to convey second identification information of the first one of the network devices to the camera apparatus, the camera apparatus to determine a location of the first one of the network devices based on the first identification information and the light signal.

16. The system of claim 15, further including a motion sensor, wherein the request is a first request, the light signal is a first light signal, and the first one of the network devices is to:
access a second request from the apparatus, the second request to instruct the first one of the network devices to use the light producing device to identify the first one of the network devices, the second request to be received from the apparatus after a notification is provided; and
cause, in response to the second request, the light producing device to output a second light signal to identify the first one of the network devices.

17. The system of claim 15, wherein the apparatus is to:
detect, with a camera, a gesture made by a user in the physical space;
determine the gesture is directed toward the first one of the network devices based on the location of the first one of the network devices; and
transmit a command to the first one of the network devices in response to the gesture made by a user in the physical space.

18. The system of claim 15, wherein the first one of the network devices is to provide the first identification information in response to the first one of the network devices being added to the network.

19. The system of claim 15, wherein the first identification information is a network address of the first one of the network devices.

20. The system of claim 15, wherein the light signal is to convey the second identification information via a blinking pattern.

\* \* \* \* \*